US008452720B2

(12) United States Patent
Zhou et al.

(10) Patent No.: US 8,452,720 B2
(45) Date of Patent: May 28, 2013

(54) SYSTEM AND METHODS FOR OPTIMIZING USER INTERACTION IN WEB-RELATED ACTIVITES

(75) Inventors: Dong Zhou, San Jose, CA (US); Ajay Chander, San Francisco, CA (US); Hiroshi Inamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 686 days.

(21) Appl. No.: 12/692,442

(22) Filed: Jan. 22, 2010

(65) Prior Publication Data
US 2010/0198768 A1 Aug. 5, 2010

Related U.S. Application Data

(60) Provisional application No. 61/148,782, filed on Jan. 30, 2009.

(51) Int. Cl.
*G06F 17/00* (2006.01)
*G06F 7/00* (2006.01)

(52) U.S. Cl.
USPC ............................................. 706/47; 707/600

(58) Field of Classification Search
None
See application file for complete search history.

(56) References Cited

U.S. PATENT DOCUMENTS

| 2007/0061735 A1 | 3/2007 | Hoffberg et al. | |
| 2007/0156747 A1* | 7/2007 | Samuelson | 707/102 |

FOREIGN PATENT DOCUMENTS

| EP | 0401975 A | 12/1990 |
| EP | 0566228 A | 10/1993 |

OTHER PUBLICATIONS

PCT International Search Report for corresponding Patent Application No. PCT/US2010/022128, Apr. 6, 2010, 6 pgs.
PCT Written Opinion of the International Searching Authority for corresponding Patent Application No. PCT/US2010/022128, Apr. 6, 2010, 6 pgs.
Hattori, Gen, et al., "Robust Web Page Segmentation for Mobile Terminal Using Content-Distances and Page Layout Information", WWW 2007 / Track: Pervasive Web and Mobility, May 8, 2007, pp. 361-370, Banff, Alberta, Canada.
Baluja, Shumeet, "Browsing on Small Screens: Recasting Web-Page Segmentation into an Efficient Machine Learning Framework", WWW 2006, May 23, 2006, 10 pgs., Edinburgh, Scotland.
Yang, Christopher C., et al., "Fractal Summarization for Mobile Devices to Access Large Documents on the Web", WWW 2003, May 20, 2003, Budapest, Hungary.
"Simplifying web-based processes", http://coscriptor.research.ibm.com/coscriptor.
Geven, A, et al, "Depth and Breadth Away from Desktop: The Optimal Information Hierarchy for Mobile Use," Proceedings of MobileHCI, 2006.
Leshed, G, et al, "CoScripter: Automating & Sharing How-To Knowledge in the Enterprise," Proceedings of CHI, 2008.
Nichols, J, et al, "Mobilization by Demonstration: Using Traces to Re-Author Existing Web Sites," Proceedings of IUI, 2008.
Rukzio, E, et al, "Privacy-Enhanced Intelligent Automatic Form Filling for Context-Aware Services on Mobile Devices," Artificial Intelligence in Mobile Systems (AIMS), 2004.

* cited by examiner

*Primary Examiner* — Alan Chen
(74) *Attorney, Agent, or Firm* — Blakely, Sokoloff, Taylor & Zafman LLP

(57) ABSTRACT

A method and apparatus is disclosed herein for facilitating user interaction in web-related activities. In one embodiment, the method comprises monitoring a user's current interaction with a browser, predicting a task a user is likely to take based on a current interaction context associated with the user's current interaction and one or more rules previously generated based on one or more previously recorded browser interactions, and generating, based on the prediction, and displaying a user interface component with the browser, the user interface component selectable by the user and representing an interaction (or a sequence of interactions) that the user can select to occur.

11 Claims, 12 Drawing Sheets

Components of a Monitoring Component (MC)

An embodiment of the system with all components of residing on the same client

An embodiment of the system with a server and different types of clients

Components of a Monitoring Component (MC)

An example of breaking down event sequences into trails

Sub-Components of the Rule Generation Component

Processing flow for selecting target trails

Processing flow for selecting target trails

The Page-Load Optimization Process

The input Optimization Process

Embodiment of a Rule Generation Component with rule extension support

Sub-components of the Rule Application Component

The process for rule matching used by the Rule Matching Module

The process for rule matching when state reduction is supported

Embodiment of UI mechanism for the ZVBox example

SYSTEM AND METHODS FOR OPTIMIZING USER INTERACTION IN WEB-RELATED ACTIVITES

PRIORITY

The present patent application claims priority to and incorporates by reference the corresponding provisional patent application Ser. No. 61/148,782, titled, "System and Methods for Optimizing User Interaction in Web-related Activities," filed on Jan. 30, 2009.

FIELD OF THE INVENTION

Embodiments of the present invention relate to the field of optimizing user interaction with mobile devices or other computing systems with user-machine interface; more particularly, embodiments of the present invention relate to Web-based applications.

BACKGROUND OF THE INVENTION

It is typically much more difficult to interact with mobile devices (such as cell phones and PDAs) than with personal computers. The small form factor of mobile devices makes it particularly hard to input text, with or without hardware keypads. Copying data from one screen to another is also more difficult because of a lack of multi-window or built-in copy/paste supports. In addition, cellular networks are typically less stable in connectivity than land-line or WiFi connections and have longer latency, resulting in longer user wait time for network-based applications (such as Web browser based activities). These are the disadvantages that need to be ameliorated before users can more extensively use a mobile application, particularly network-based applications including mobile browsing.

CoScripter from IBM Corporation, New York, is a system that can record and automatically replay user interaction steps for Web browser based tasks. A user can explicitly request to have his interactions with the browser recorded, and save the recorded information in a scripting language. Such scripts can be shared with other users and be automatically played back later, with minimal user action required. One drawback of CoScripter is that it depends on an explicit user instruction for recording and playing back scripts. This puts a burden on the user to identify frequent tasks and to remember scripts corresponding to frequent tasks. In addition, although CoScripter reduces the amount of user input for recorded tasks, it doesn't reduce user wait time for such tasks.

One way to reduce user wait time in Web browsing is to break larger Web pages into smaller pages. Much research has been conducted in methods for segmenting larger Web pages. They include approaches based on fractal theory, on machine learning techniques, and on content distance and page layout.

While Web page segmentation techniques generally reduce user wait time for each page-load request as pages now become smaller, they may not reduce the total amount of user wait time for a given task. Reducing the sizes of pages likely also increases the number of navigations steps a user must take to complete a task, which may increase the total amount of time it takes for the task.

SUMMARY OF THE INVENTION

A method and apparatus is disclosed herein for facilitating user interaction in web-related activities. In one embodiment, the method comprises monitoring a user's current interaction with a browser, predicting a task a user is likely to take based on a current interaction context associated with the user's current interaction and one or more rules previously generated based on one or more previously recorded browser interactions, and generating, based on the prediction, and displaying a user interface component with the browser, the user interface component selectable by the user and representing an interaction (or a sequence of interactions) that the user can select to occur.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
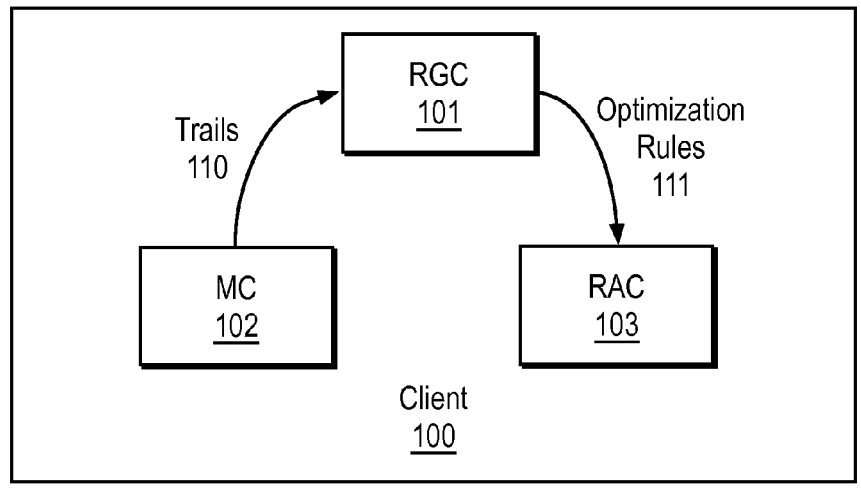
FIG. 1 is a block diagram of one embodiment of the system residing on the same client.

Embodiments of the invention draw on information about users' past interaction with their devices or computers to predict what interactions users are likely to conduct next, and to make such predicted interactions easier to conduct. In one embodiment, a system predicts a sequence of likely next steps of interaction, determines the likely data input for each step (data used for input can be data contained in a preceding step), prefetches pages that can be pre-determined and are expected to be used in one of successive steps, and allows directly jumping into one of the successive steps without stepping through preceding steps. In this way, embodiments of the invention can potentially both reduce the amount of user input and shorten user wait time. For example, if based on user interaction history a conclusion can be made that once a user highlights (or taps on) a phrase, he is likely to search the phrase on google.com (or live.com), then the user interface can be enhanced so that the user only needs to click a button to search for the phrase once he has highlighted the phrase, instead of needing to go through steps including "copying the phrase to the clipboard", "open the google.com page", and "paste the content of the clipboard to the search box and submit".

In one embodiment, the above mentioned interaction history includes the user's past interaction with the current device, the same user's past interaction with his other devices or personal computers, as well as other users' past interactions with their devices or computers.

In one embodiment, the interaction history is stored as trails in databases. A trail is a segment of a user interaction sequence, which reflects a burst of user interaction activities. A long sequence of user interaction with a device can be divided into multiple trails at abnormally long time gaps (e.g., 30 seconds, 60 seconds, etc.) along the sequence. For example, assuming a user opens his Web browser, goes to gadgettell.com, navigates to an article describing a device called "ZVBox", spends several minutes reading the article, and then goes to amazon.com to search for "ZVBox" to see if it's on sale there. This sequence of actions can be broken into two trails at the point that the user reads the "ZVBox" article.

A trail does not strictly correspond to a user level task. In one embodiment, a trail can be part of a user level task, or it can contain multiple user level tasks. Not requiring strict correlation between trails and user level tasks makes it much easier for trail generation as it is widely acknowledged that it is difficult for software programs to accurately identify user level tasks.

A trail is also typically short, as users frequently pause to read some of the Web pages as they navigate through them. Shorter in length makes it less likely to contain interaction noises in a typical meaningful trail than in a long interaction sequence. Being shorter also makes it more likely to be repeated and hence more likely to provide statistically significant data for separating frequently used trails from less frequently used trails.

In one embodiment, a trail is formally represented as a sequence of interaction states, and the events that trigger the transition from one interaction state to its successive state. An interaction state describes the page that is currently loaded in the browser, the string on the page that is currently highlighted, the current content of the clipboard, and the inputs the user has made to the current page (e.g., by filling form fields on a page). User activities that trigger changes to the currently interaction state are monitored. In one embodiment, the following events are logged and recorded: page-loading events, text-highlight events, text-copy events, text-paste events, and form-input events.

Interaction optimization rules can be established from a pool of recorded trails. For each trail prefix, an attempt is made to find matching trails from the pool. In the case that there are matching trails, and that at least one of the matching trails have a tail (the part of the trail that succeeds the prefix) with interaction cost greater than a customizable threshold value, such matching trail(s) with high interaction cost(s) are selected as candidates for optimization rule generation. In one embodiment, interaction cost of a tail is calculated by a customizable function that takes into consideration, among others, the frequency of the trail used, and the amount of user input and page loading involved in the tail part of the trail. An example of such weighted interaction cost function is in the form of $C(t)=(1+\ln(vc))*(ic+lc)$, where t is the tail in consideration, vc is the visit count of the trail, ic is the number of input events in the tail, and lc is the number of page load events in the tail. In one embodiment, the corresponding threshold value is set to 2.

In one embodiment, the tail part of a candidate trail is optimized such that:
  For each page-load event, if the page to be loaded is known, then a page pre-fetch event is added to the start of the tail.
  For each page-load event, if the URL or request parameters for the page to be loaded depends on one or more form-input events, then link the page-load event to such form-input events, so that the correct page can be loaded when values of the form-input events change.
  Remove text-highlight, text-copy, and text-paste events from the tail.

The prefix and this optimized tail are then used to construct an interaction optimization rule, with the prefix as the head and the optimized tail as the body. Such an optimization rule is used when the user's current interaction activities match the prefix of the rule. In such a case, the pre-fetch events at the start of the tail (body of the rule) are first performed, and optimization user interface (UI) widgets are then created and non-obtrusively displayed in areas such as the status bar of the browser, to inform the user of potential interaction optimization opportunities.

In one embodiment, each optimization UI widget corresponds to a form-input event or a page-load event. A UI widget corresponding to a form-input event can be in the form of a text input box, initialized with the value of the form-input event. Changes in the content of the text input box causes changes in the page-load event(s) linked to the form-input event. A UI widget corresponding to a page-load event can be in the form of a button or a hyperlink, and when activated, can cause the page indicated by the page-load event to be loaded in the browser, effectively serving as a shortcut.

A user can opt to ignore such optimization UI widgets, or he can use them to reduce the amount spent waiting for pages to load, and reduce the amount of typing or copy/pasting he has to make.

In one embodiment, the optimization rules described above can only be used when the prefix of a rule matches the user's current sequence of activities. That is, the states contained in the prefix must be exactly the same as the user's current sequence of states. Recall that the interaction state includes at least information about the page currently loaded in the browser, the content of the clipboard, the highlighted text on the current page, and the user inputs made to the current page. The size of the space defined by the valid values of the interaction state is thus very large. A problem with such large state space is that the chances of having matching state sequences are small, making it hard to differentiate frequently used tasks from rarely used tasks. An event more serious problem is that it prevents an optimization rule generated from one task to be applied to a slightly different task, and precludes any optimization rules to be applied to any tasks that involve a newly generated page that are essentially a newer version of a previously used page (such as a page that embeds session information).

To increase the chance of having repeatedly used tasks and to extend generated optimization rules to similar tasks, it is important to reduce the size of the interaction state space. One way to reduce the size of the interaction state space is to reduce the number of distinctive values of the state variables, particularly the variable for currently loaded page. For example, pages having the same content or same document structure can be treated as equivalent pages, or consider pages having the same URL prefix as equivalent pages. In addition, if pages A and B are considered equivalent pages, and if there is a hyperlink on page A having displayed text equivalent to that of a hyperlink on page B, then the pages pointed to by the two hyperlinks can be considered and treated as equivalent as well, even though their underlying URLs may be different.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

A System Overview

FIG. 1 is a block diagram of one embodiment of the system of the present invention, where all three components (monitoring component (MC) 102, rule generation component (RGC) 101, and rule application component (RAC) 103) reside on the same client device 100. This particular embodiment corresponds to a user keeping his interaction history private, and lets the system discover interaction optimization rules based on his private history.

Referring to FIG. 1, MC 102 collects interaction data and constructs trails. In one embodiment, trails 110 generated by MC 102 never leave the client device 100 as they are directly handed over to the local RGC 101. RGC 101 identifies target tasks for optimization as described herein and generates optimized functions for future interactions for a given context. These optimized functions are optimization rules 111, which RGC 101 directly hands over to the local RAC 103. RAC 103 performs matching and applies rules 111 as described herein. In essence, RAC 103 makes a prediction using the current interaction context as to what the user is likely to do and provides the user with a non-intrusive UI, which the user may select to have the task performed. This is described in more detail below.

Thus, the techniques described herein enable auto-capture and creation of context-sensitive, 2-dimensional, parameterized "bookmarks" that are extendable to similar tasks.

Figure 2:
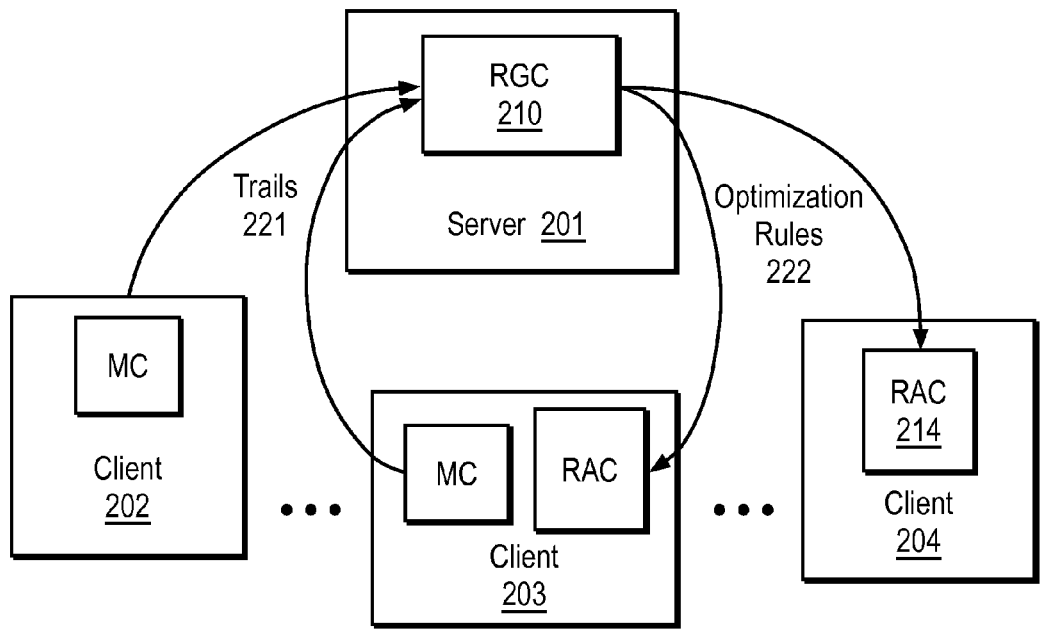
FIG. 2 is a block diagram of one embodiment of the system with a server and different types of clients.

FIG. 2 is a block diagram of a more general embodiment of the system, where there is a server 201 dedicated to hosting RGC component 210. Referring to FIG. 2, each client device, such as clients 202-204, either hosts one of the MC and RAC components (as in the case of clients 202-204), or hosts both components (as in the case of client 203). Trails generated by client devices hosting MC components, such as trails 221 from client 2020, are sent to RGC server 201, and optimization rules generated by RGC server 201 are then used by client devices hosting the RAC component, such as optimization rules 222 being sent the RAC 214 of client 204.

A client device that only hosts the MC component represents a user that is willing to provide interaction history information, but does not rely on the separate system to provide interaction optimization based on such interaction history information. This configuration might be used by a personal computer (PC) user as an interaction is relatively easier to conduct on a PC. However, the same user may still take advantage of the system when he uses a mobile device where a RAC is deployed.

In one embodiment, a client device only has the RAC deployed, so that the user of the device can take advantage of the system without having to provide interaction history information.

An Example of a Monitoring Component

Figure 3:
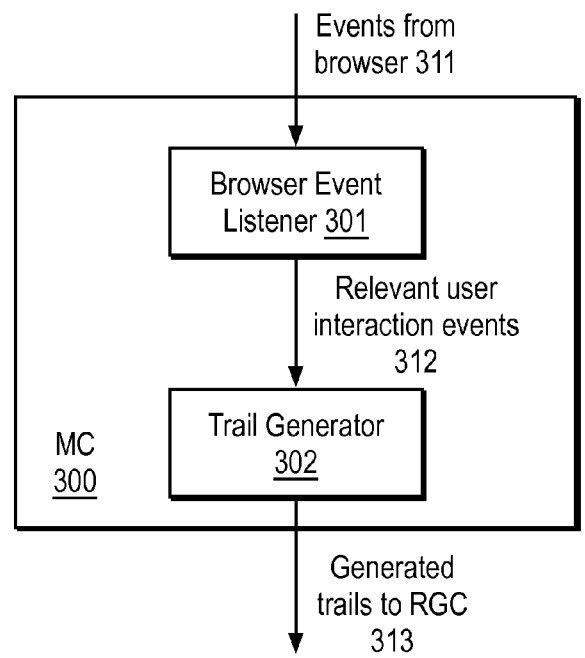
FIG. 3 is a block diagram of components of one embodiment of a monitoring component (MC).

FIG. 3 is a block diagram of one embodiment of an MC. Referring to FIG. 3, MC 300 comprises a browser event listener 301 and a trail generator 302. Browser event listener 301 listens to events 311 corresponding to user interaction with the browser, and, in one embodiment, normalizes such events into following event types of interest:

page-load event, which corresponds to page load requests resulted from user actions such as clicking (or hitting enter key at) a hyperlink, hitting enter key in the URL bar, clicking a form submit button, or clicking certain browser toolbar buttons and selecting browser menu items (e.g., "Home" and "Back/Forward" buttons and browser history).

text-highlight event, which corresponds to user highlighting a text string on the current page.

text-copy event, which corresponds to user copying highlighted text on the current page to the clipboard.

text-paste event, which corresponds to user copying clipboard content to an input field of a form of the current page.

form-input event, which corresponds to user inputs to an input field of a form of the current page. A form-input event can be caused by a text-paste event or simply by user typing text in the input field.

Each of these events changes the interaction state. In one embodiment, the interaction state is defined by the values of following variables:

the page that is currently opened and/or being viewed in the browser, the highlighted text of the current page, content of the clipboard, form inputs made to the current page, and inputs in the URL bar.

Trail generator 302 of MC 300 receives relevant user interaction events 312 from browser event listener 301, and breaks a sequence of such events into trails 313. A trail is a segment of an interaction event sequence. In one embodiment, a trail is a sequential list of nodes, with each node denoting an interaction state. A directed arc from one node to another stands for an event that caused the transition between the two interaction states.

Figure 4:
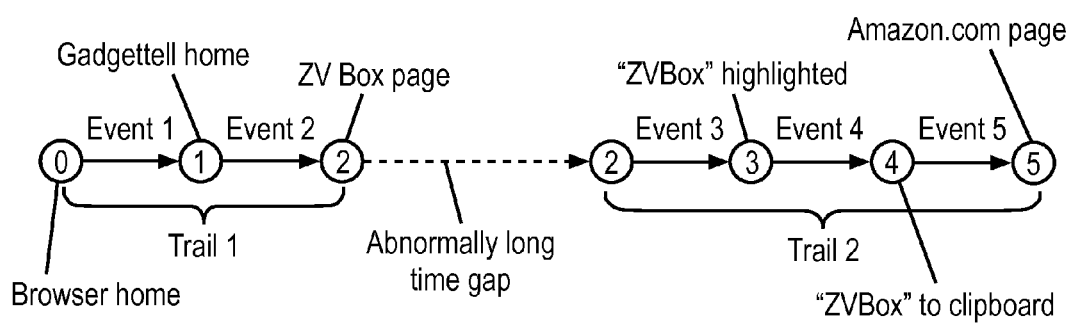
FIG. 4 illustrates an example of breaking down event sequences into trails.

In one embodiment, event sequences are broken down at places with abnormally long time gaps. These abnormally long time gaps can be any length, such as 30 seconds, 60 seconds, etc. and may depend on the user's history. FIG. 4 shows an example: assuming a user started from opening his browser (State-0), then loaded the gadgettell.com homepage by typing the URL of the website in the URL bar (State-1), and then navigated to a page describing a gadget called "ZVBox" (State-2). Further assume that the user spent several minutes reading the "ZVBox" article and became interested in the device. Because of his interest, he highlight the word "ZVBox" in the article (State-3), copied it to the clipboard, then went to Amazon website by typing "amazon.com" in the URL bar (State-4), and finally pasted "ZVBox" into the Amazon search box (State-5) and submitted a search request (State-6, which is not shown).

This sequence of events can be broken down into two trails, one with (State-0, State-1, State-2) and the other with (State-2, State-3, State-4, State-5, and State-6), as the user spends an "abnormally long" time at State-2 before he triggered another interaction event to go to State-3. In one embodiment, "abnormally long" is quantified as greater than Alpha*Mean+Beta*Dev, where Mean is the average transitioning time between two consecutive states within the same trail, Dev is its standard deviation, and both Alpha and Beta are customizable coefficients. A sample value for Alpha is 1.5 and a sample value for Beta is 2.

Note that a trail does not have to strictly correspond to a task, but may be a lightweight approximation of a task in that it involves less computation and effort for the user. Trails are stored in one or more trail databases; a trail can be saved to a database private to the user, and also optionally saved to any database entitled to a user group that the user belongs to.

An Example of a Rule Generation Component

Figure 5:
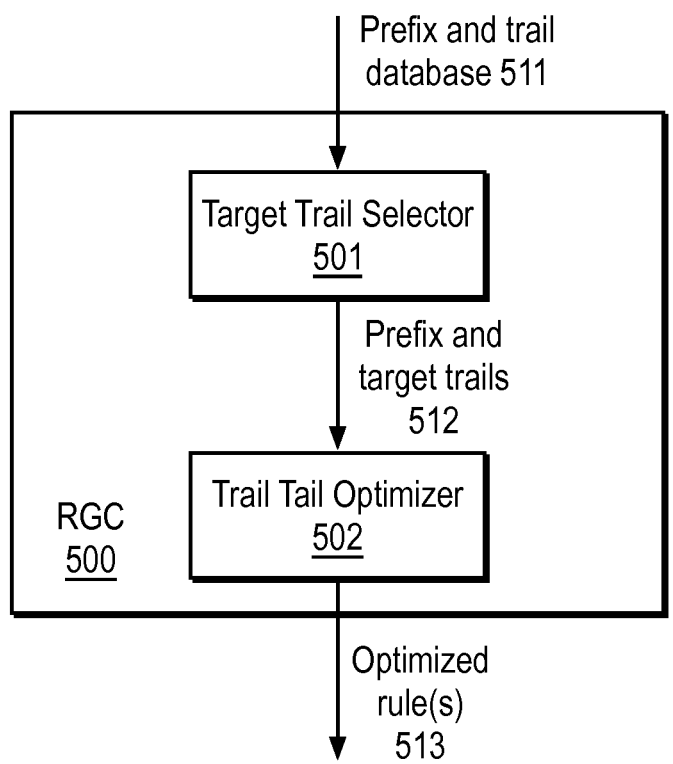
FIG. 5 is a block diagram of sub-components of one embodiment of a rule generation component (RGC).

FIG. 5 is a block diagram of modules of one embodiment of a rule generation component (RGC). In one embodiment, the RGC performs a content-based rule generalization method. Referring to FIG. 5, RGC 500 has two modules: target trail selector 501 and trail tail optimizer 502.

In one embodiment, target trail selector 501 accepts a trail database and a prefix (511) of one of the trails in the database (called the Prefix), and returns zero or more trails 512 that are: a) in the trail database, b) matches the Prefix, and c) have interaction cost greater than a customizable threshold.

In one embodiment, target trail selector 501 finds, for each context, trail tails with the highest optimization payoff, calculates the payoff for each tail using the tail length, visit count, and event types, normalizes the tails for the same context, and selects as targets those tails with normalized payoffs above a threshold. Note that there could be multiple targets for the same context. In one embodiment, optimization payoff for each tail is calculated using the sample weighted interaction cost function described in paragraph 15 above, and is normalized after being divided by the combined optimization payoff of all tails. A sample value of the threshold of this embodiment is 0.02. In another embodiment, after the optimization payoff for a tail is similarly calculated, it is normalized after being divided by the optimization payoff of the tail with $n_{th}$ highest payoff, where n is set to 10 or the total number of matching tails, whichever is smaller. The threshold for this embodiment is set to 1. This latter embodiment essentially returns at most n tails that have higher optimization payoff than other tails.

Figure 6:
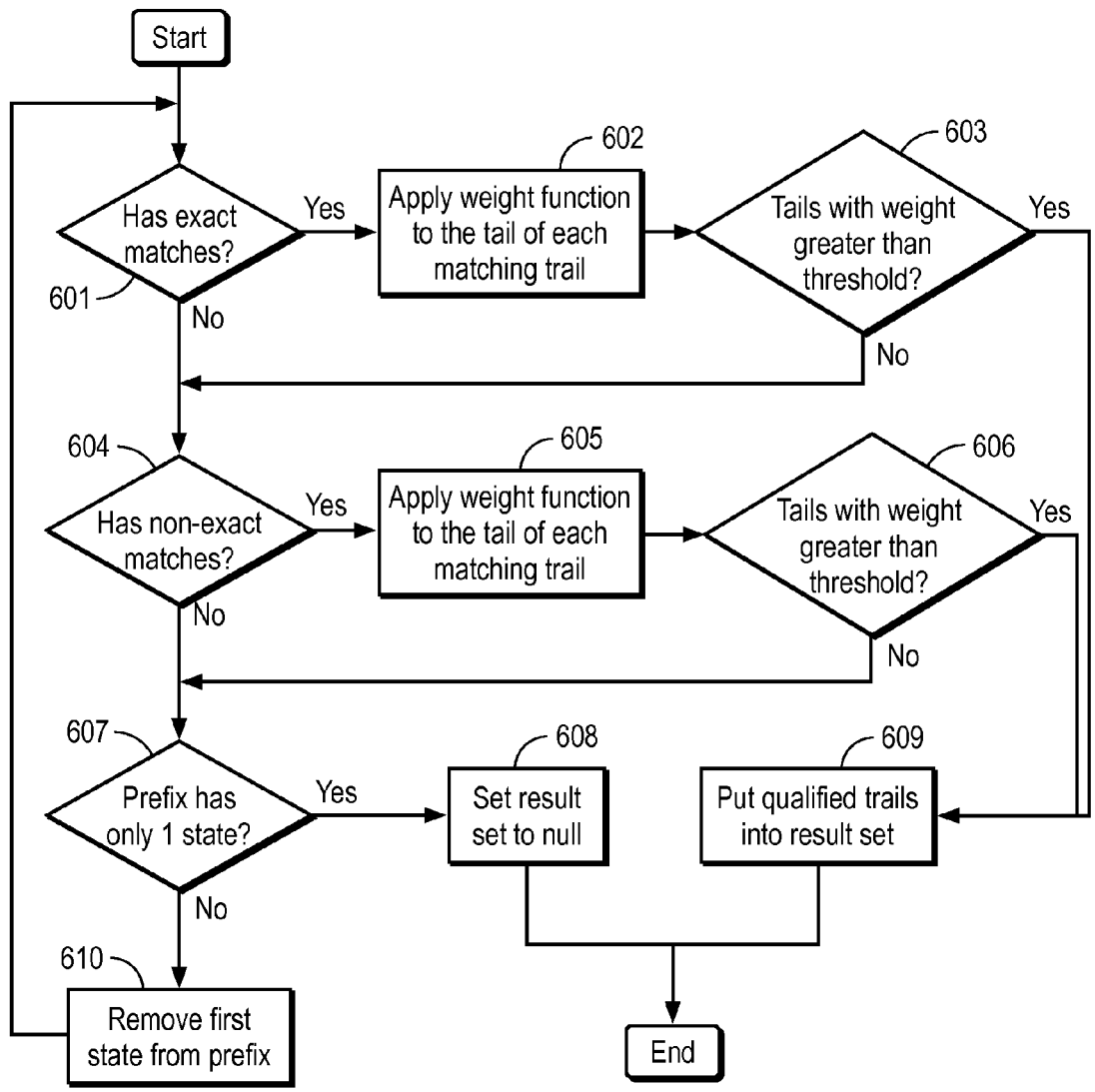
FIG. 6 is a flow diagram of one embodiment of a process for selecting target trails.

One embodiment of the processing flow for target trail selection is shown in FIG. 6. The process of FIG. 6 is performed by processing logic that may comprise hardware (circuitry, dedicated logic, etc.), software (such as is run on a general purpose computer system or a dedicated machine), or a combination of both.

Referring to FIG. 6, the process begins by processing logic checking whether there are trails in the database that are exact matches of the Prefix (processing block 601). In one embodiment, a trail is an exact match of the Prefix if one of the prefixes of the trail is identical to the Prefix. In the case of an exact match, the rest of the trail after the matching prefix is called the tail.

When there is at least one exact match, processing logic applies a normalized interaction cost calculation function to the tail of each exact matching trail to calculate the normalized interaction cost of the tail (processing block 602).

Processing logic then checks whether there are tails each with interaction cost greater than a customizable threshold value (processing block 603), and if there are, processing logic outputs trails with such tails as target trails (processing block 609) and the process terminates.

When there are no exact matches, or when none of the exact matches has a tail with interaction cost greater than the threshold value, processing logic attempts to find non-exact matches of the Prefix (processing block 604). In one embodiment, a trail is a non-exact match for the Prefix if the trail contains the Prefix. Similar to the handling of exact matches, when there is at least one non-exact match, the process applies the above normalized interaction cost calculation function to the tail of each non-exact matching trail to calculate the interaction cost of the tail (processing block 605). Processing logic then checks whether there are tails each with interaction cost greater than the same customizable threshold value (processing block 606), and if there are, processing logic outputs trails with such tails as target trails (processing block 609) and the process terminates.

When there are no non-exact matches, or when none of the non-exact matches having tail with interaction cost greater than the threshold value, processing logic checks whether the Prefix has only one state (processing block 607). If the Prefix has only one state, processing logic outputs an empty set (processing block 608) and the process terminates; otherwise, processing logic removes the first state from the Prefix to get a new Prefix (processing block 610), and the process returns the result of applying the same process on this new Prefix.

After a trail tail has been selected, the trail tail optimization process is performed by the trail tail optimizer. In one embodiment, this process involves applying pre-processing in which certain pages are marked for pre-fetching or complex pages are prioritized for loading. Note this only applies if the next page(s) to load are fixed or predictable. In one embodiment, the process also involves determining if an input event is involved and if so, performing an automatic input in which values for the input events are instantiated. In one embodiment, the process also involves determining if an input event is linked to a page load event and if so, connecting the two so that changes in the input causes a change in the URL to be loaded. The result is the generation of an optimization rule.

Figure 7:
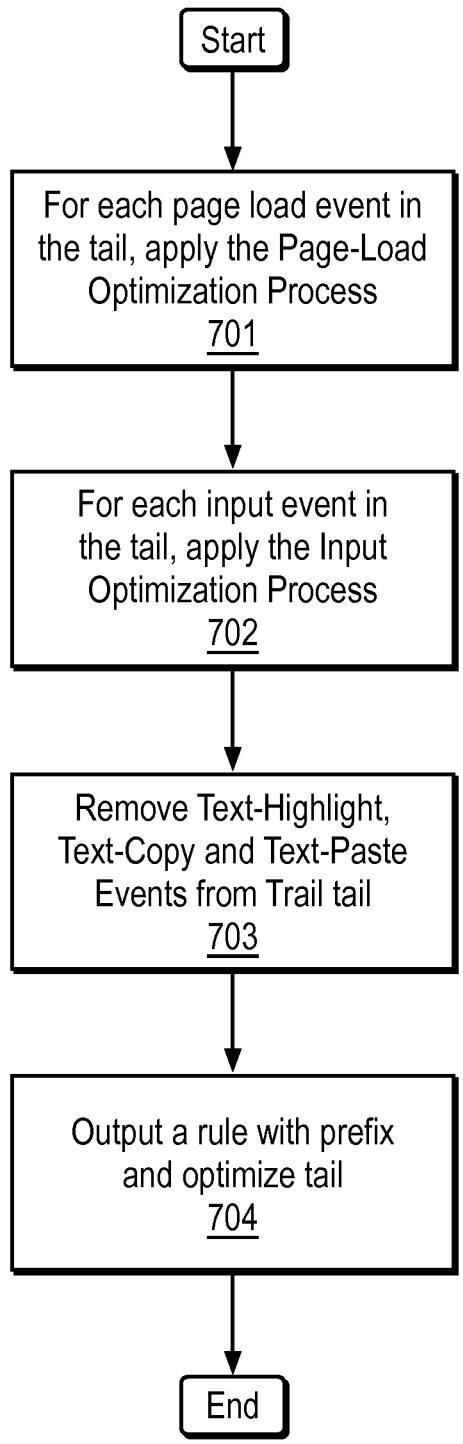
FIG. 7 is a flow diagram of one embodiment of a process for trail tail optimization.

FIG. 7 is a flow diagram of one embodiment of a process used by the trail tail optimizer. The process is performed by processing logic that may comprise hardware (circuitry, dedicated logic, etc.), software (such as is run on a general purpose computer system or a dedicated machine), or a combination of both. The process takes as inputs a target trail and the Prefix for which the target trail was selected and generates an optimization rule.

Referring to FIG. 7, the process begins by the processing logic first applying a page-load optimization process (described in more detail below) to each page-load event in the tail of the target trail (processing block 701). Processing logic then applies the input optimization process to each form-input event in the tail (processing block 702). Processing logic then removes all text-highlight, text-copy, and text-paste events from the tail (processing block 703) and outputs an optimization rule using the Prefix as the rule head and the optimized tail as the rule body (processing block 704).

Figure 8:
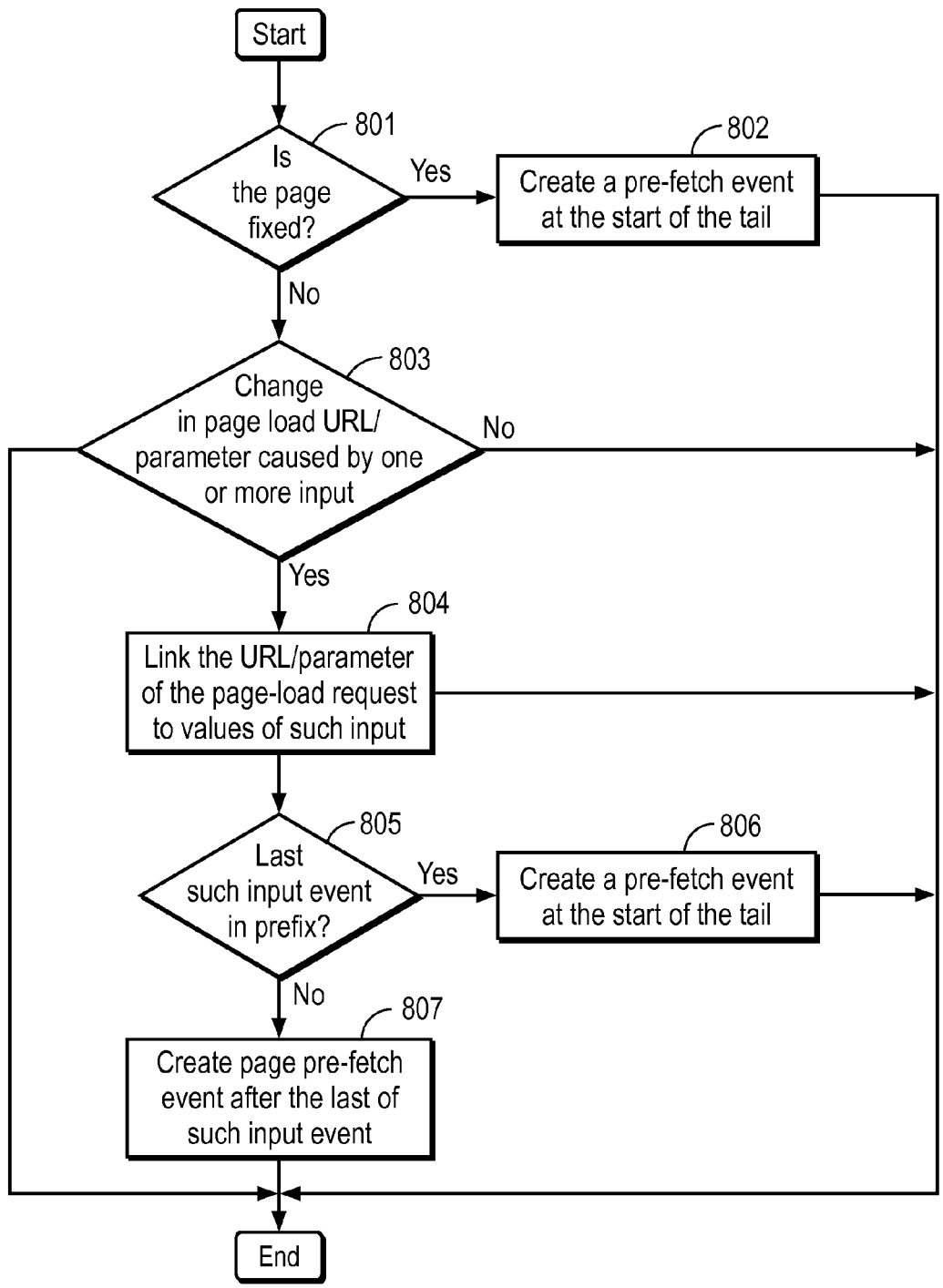
FIG. 8 is a flow diagram of one embodiment of a page-load optimization process.

FIG. 8 is a flow diagram of one embodiment of a page-load optimization process. The process is performed by processing logic that may comprise hardware (circuitry, dedicated logic, etc.), software (such as is run on a general purpose computer system or a dedicated machine), or a combination of both. The process takes as inputs a tail of the target trail and the Prefix for which the target trail was selected, as well as the page-load event to be optimized, and returns a modified tail.

Referring to FIG. 8, the process begins with processing logic checking whether a resource locator (e.g., URL) of the page to be loaded is fixed (processing block 801). If it is, processing logic then adds a special pre-fetch event to the start of the tail (processing block 802). Otherwise, processing logic checks whether changes of the URL or parameters of the page-load request depend solely on the changes in the values of preceding form-input events (processing block 803). If this is not the case, then processing terminates and returns the tail unchanged as the page will not be pre-fetched.

In the case that the changes of URL or parameters of the page load request depends solely on the changes in the values of preceding form-input events, processing logic links the page-load event to such form-input events (processing block 804), such that whenever values change for such form-input events, the URL or parameters of the page-load event is also changed accordingly. Processing logic then checks whether the last of such form-input event is in the Prefix (processing block 805), and if it is, processing logic adds a special pre-fetch event to the start of the tail and returns the tail (processing block 806). Otherwise, processing logic inserts the special pre-fetch event after the last such form-input event in the tail (processing block 806), and returns the tail.

Figure 9:
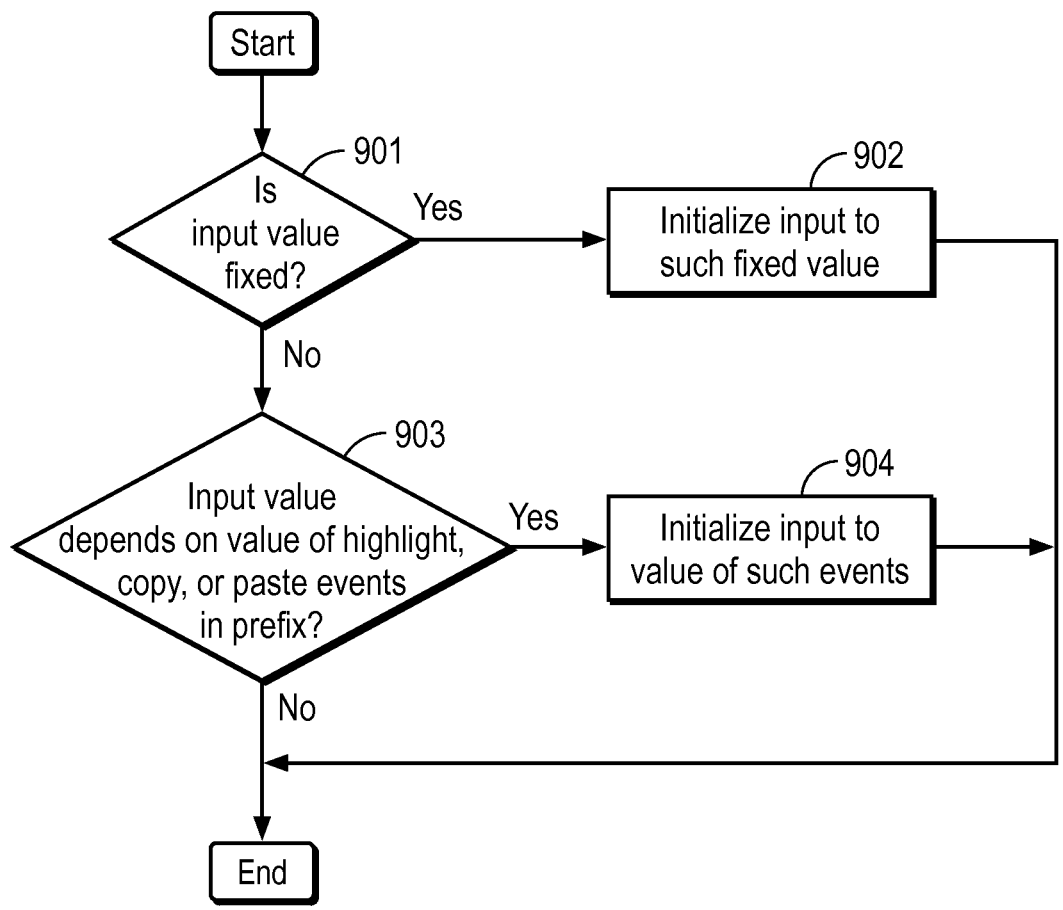
FIG. 9 is a flow diagram of one embodiment of an input optimization process.

FIG. 9 is a flow diagram of one embodiment of an input optimization process. The process is performed by processing logic that may comprise hardware (circuitry, dedicated logic, etc.), software (such as is run on a general purpose computer system or a dedicated machine), or a combination of both. The process takes as inputs a tail of the target trail and the Prefix for which the target trail was selected, as well as the form-input event to be optimized, and returns an optimized tail.

Referring to FIG. 9, the process begins by processing logic checking whether the input value for the event is fixed (processing block 901). If it is, then processing logic initializes the input value of the event to this fixed value (processing block 902). Otherwise, processing logic checks whether the input value depends on the value of any text-highlight, text-copy, or text-paste event in the Prefix (processing block 903). If it is, then processing logic initializes the input value of the event to the value of such events (processing block 904); otherwise, the input value is initialized to the empty string.

Figure 10:
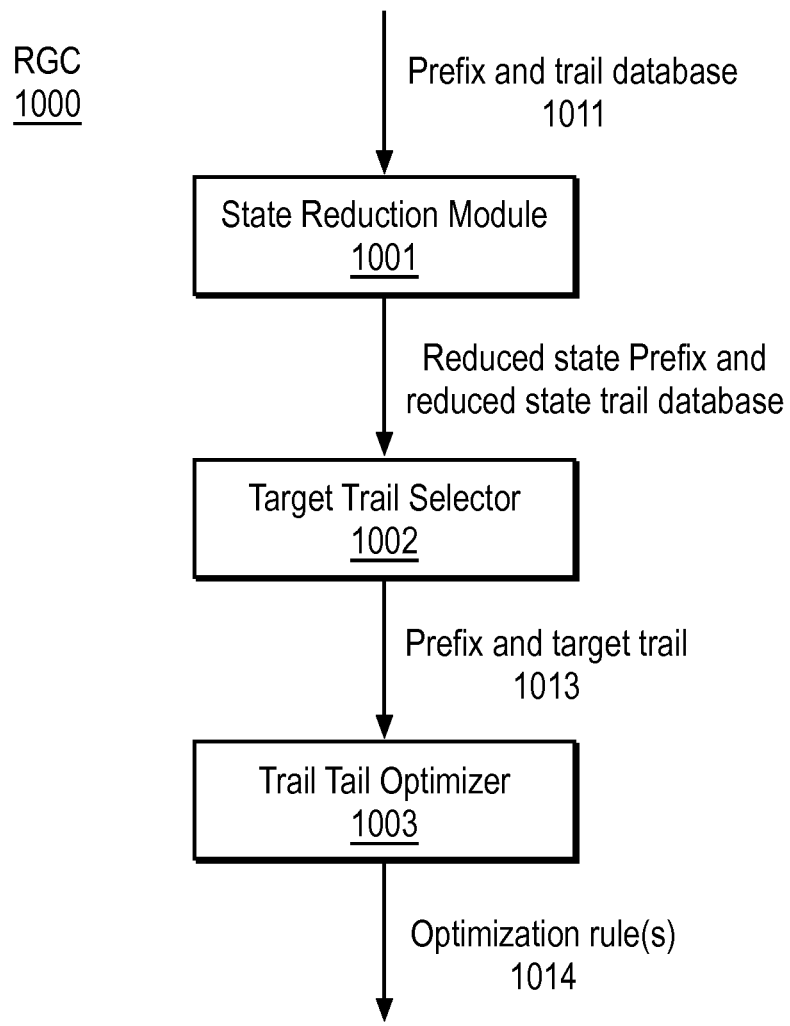
FIG. 10 illustrates one embodiment of a rule generation component with rule extension support.

FIG. 10 is a block diagram of an alternative embodiment of the RGC. This embodiment is similar as the embodiment illustrated in FIG. 5, but has an additional state reduction module 1001. State reduction module 1001 takes the Prefix and the trail database 1011 generates a new Prefix with reduced states as well as a new trail database with reduced states 1012, and sends such reduced-state Prefix and trail database to the target trail selector 1002. In one embodiment of the state reduction module 1001, a trail or a Prefix is reduced by replacing some of their page-load events with corresponding indirect page-load events. Such replacement happens to page-load events that are triggered by activating a hyperlink or submitting a form on the current page (instead of, e.g., clicking browser toolbar buttons). When the event is trigger by activating a hyperlink, the indirect page-load event records the displayed text of the hyperlink. Otherwise, it records the label of the button.

An Example of a Rule Application Component

Figure 11:
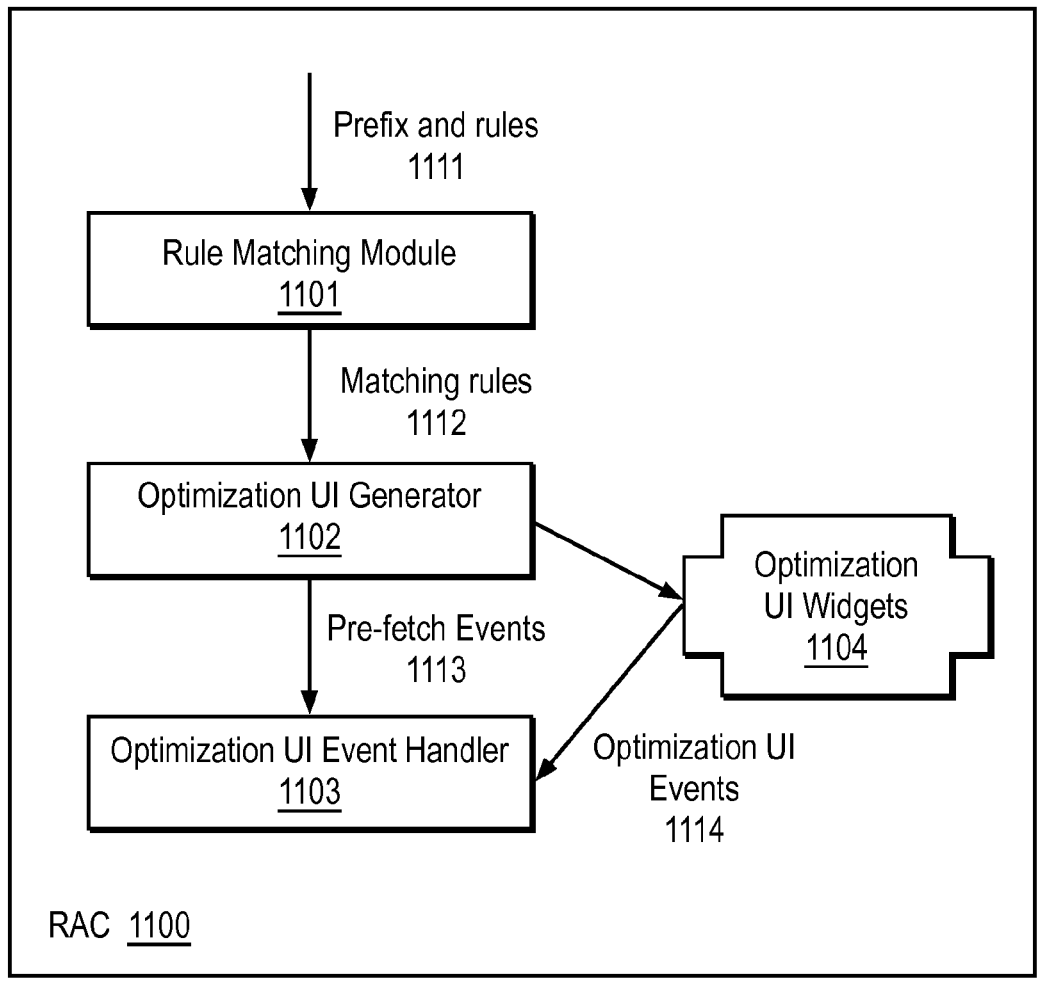
FIG. 11 illustrates sub-components of one embodiment of the rule application component (RAC).

FIG. 11 is a block diagram of one embodiment of a rule application component (RAC). Referring to FIG. 11, RAC 1100 comprises a rule matching module 1101, an optimization UI generator 1102, optimization UI widgets 1104 created by generator 1102, and an optimization UI event handler 1103.

Rule matching module 1101 takes as input a Prefix and a collection of interaction optimization rules 1111, and uses the rule matching process (FIG. 12) to find rules that matches the Prefix. The process of FIG. 12 is performed by processing logic that may comprise hardware (circuitry, dedicated logic, etc.), software (such as is run on a general purpose computer system or a dedicated machine), or a combination of both.

Figure 12:
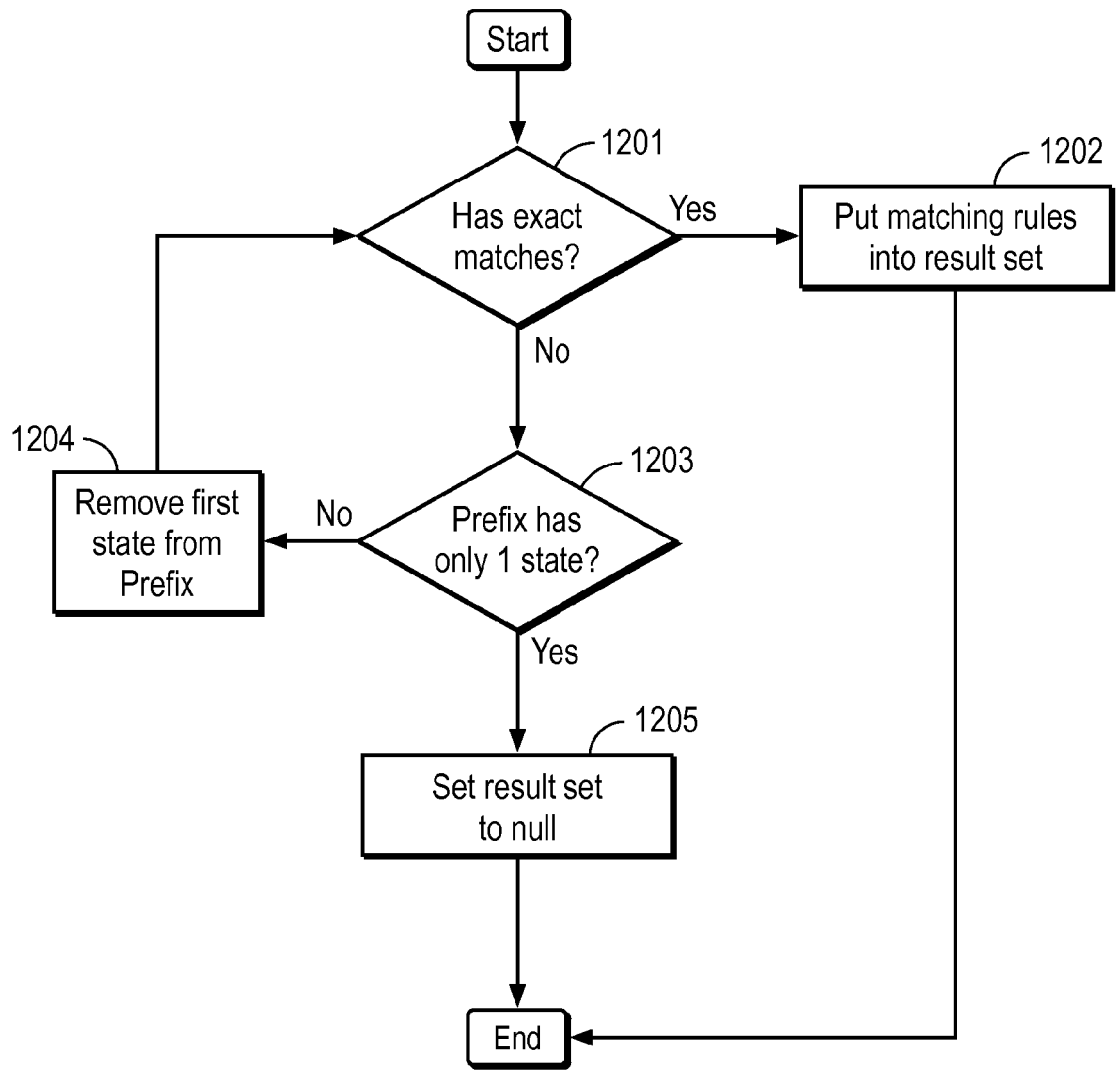
FIG. 12 is a flow diagram of one embodiment of a process for rule matching used by a rule matching module.

Referring to FIG. 12, the rule matching process first checks whether any rules from the input rule collection are exact matches of the Prefix (processing block 1201). If there is one or more exact matches, the rule matching process returns such matching rules (1112) as a result and puts them into a result set (processing block 1202). Otherwise, processing logic checks whether the Prefix has only one state (processing block 1203) and if it is true, a null result set is returned (processing block 1205). In case there is more than one state in the Prefix, processing logic removes the first state from the Prefix to create a new Prefix (processing block 1204), and returns the result to processing block 1201 to apply the same process to this new Prefix.

Figure 13:
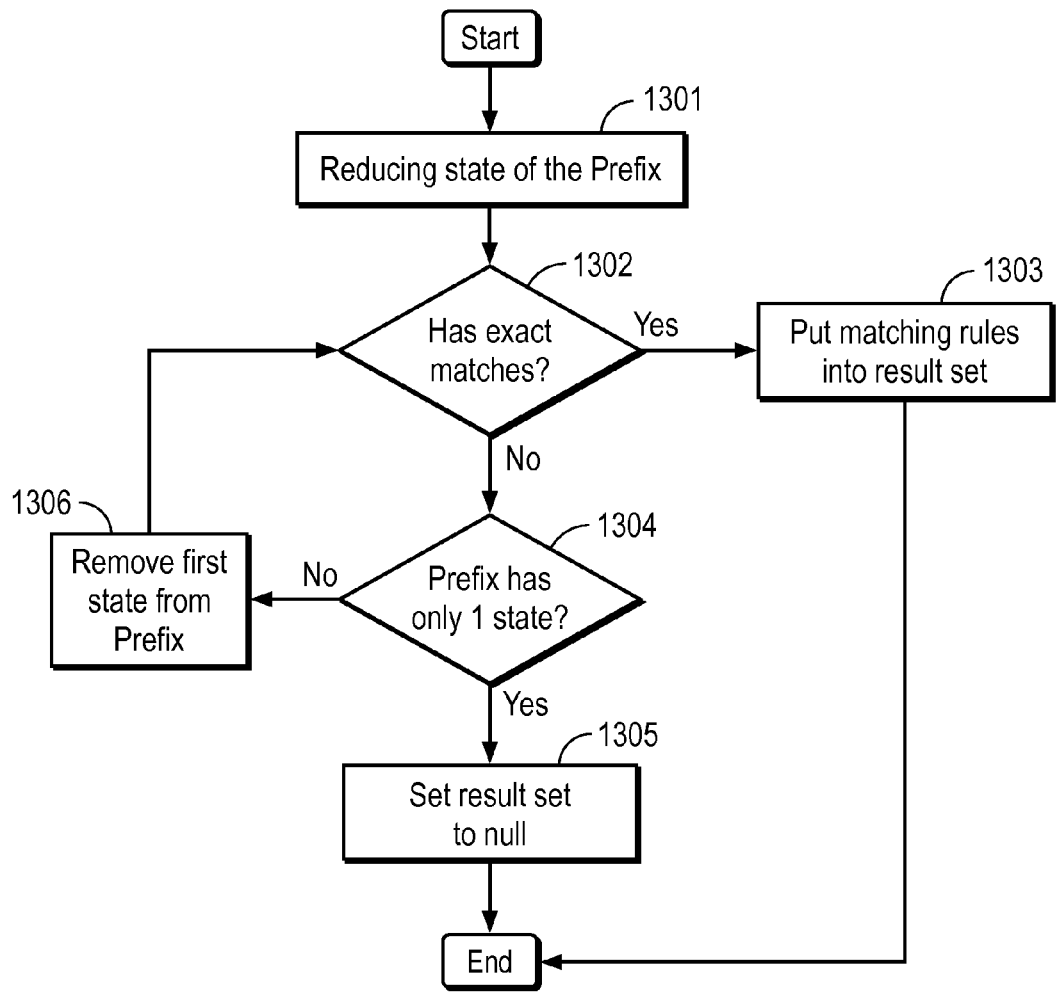
FIG. 13 is a flow diagram of one embodiment of a process for rule matching when state reduction is supported.

FIG. 13 is a flow diagram of an alternative embodiment of the rule matching process, when state reduction and rule extension is supported. This embodiment is similar to the embodiment illustrated in FIG. 12 except that at the start of the process, state reduction is performed to the Prefix (processing block 1301). In one embodiment, the Prefix is reduced by replacing some of its page-load events with corresponding indirect page-load events. Such a replacement happens to page-load events that are triggered by activating a hyperlink or submitting a form on the current page (instead of, say, clicking browser toolbar buttons). When the event is trigger by activating a hyperlink, the indirect page-load event records the displayed text of the hyperlink. Otherwise, it records the label of the button. After the state reduction, the rest of the process in FIG. 13 is the same as FIG. 12.

Figure 14:
FIG. 14 illustrates one embodiment of user interface (UI) mechanism for the ZVBox example.

Optimization UI generator 1102 takes the body of the matching optimization rule(s) 1112 and generates UI widgets for the events in the rule body(s). In one embodiment as illustrated in FIG. 14, such UI widgets take the form of clickable panels/buttons and textboxes displayed on the browser status bar. Specifically, for pre-fetch events, optimization UI generator 1102 directly sends the event to optimization UI event handler 1103; for each page-load event, generator 1102 creates a clickable button or panel with the title of the page to be loaded used as label; and for each form-input event, generator 1102 creates an editable textbox and sets the value of the textbox to the initial value of the form-input event.

Optimization UI event handler 1103 monitors and handles pre-fetch events 1113 from optimization rule generator 1102 as well as user interaction commands from optimization UI widgets 1104. In handling commands from optimization UI widgets 1104, handler 1103 first checks whether the command is from a form-input widget or a page-load widget. For a command from a form-input widget, handler 1103 updates the URL(s) or parameter(s) of page-load event(s) that are associated with the form-input event with the value of the textbox of the form-input event. For a command from a page-load widget, handler 1103 loads in the browser the page indicated by the URL and parameters of the page-load event.

In embodiments that support state reduction, optimization UI event handler 1105 also handles commands from widgets for indirect page-load events. Handler 1105 handles such command by locating the closest preceding direct page-load event in the body of the optimization rule. If there is such event, then handler 1105 directly loads the indicated page. Handler 1105 then carries out all indirect page-load events following the located direct page-load event (or from the start of the rule body when there is no such direct page-load event) until the indirect page-load event where the command came from is performed. Performing an indirect page-load event consists of finding the hyperlink matching the displayed text or the button with matching label, and activating the hyperlink or the button. This process can be delegated to a proxy machine with fast Internet connection to reduce the amount of time it takes.

An Example of a Computer System

Figure 15:
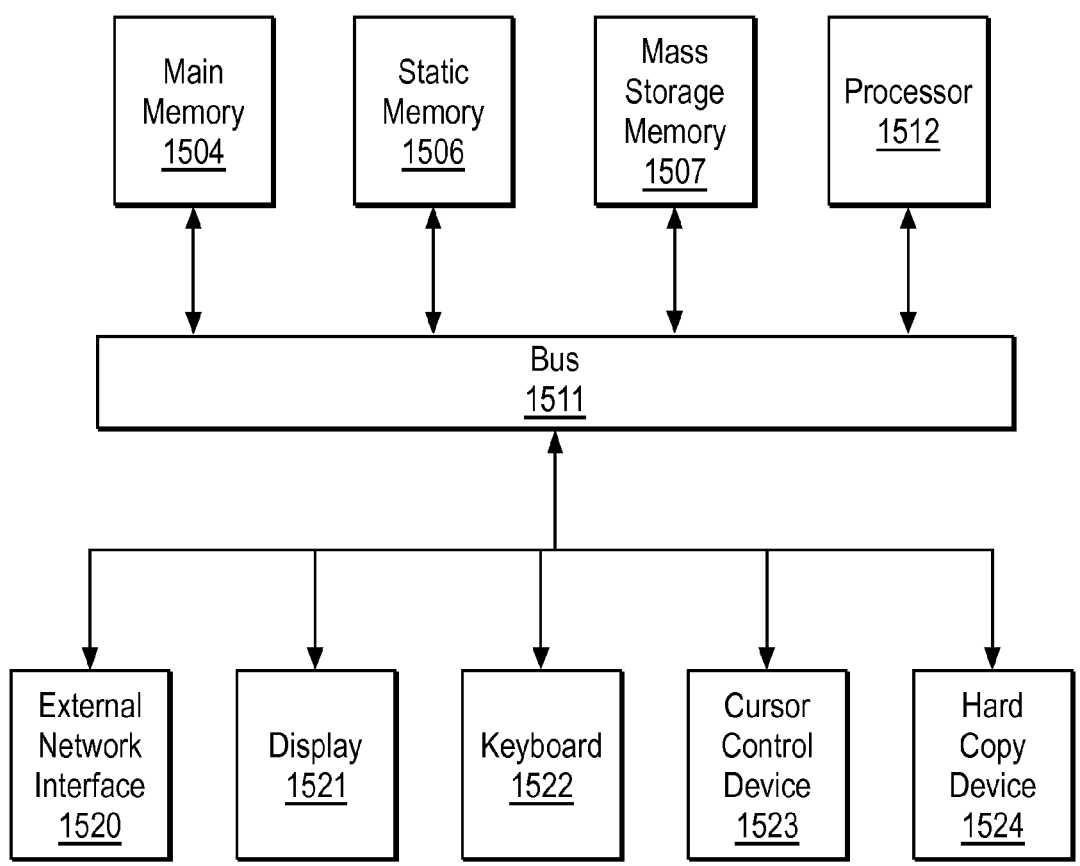
FIG. 15 is a block diagram of one embodiment of a computer system.

FIG. 15 is a block diagram of an exemplary computer system that may perform one or more of the operations described herein. Referring to FIG. 15, computer system 1500 may comprise an exemplary client or server computer system. Computer system 1500 comprises a communication mechanism or bus 1511 for communicating information, and a processor 1512 coupled with bus 1511 for processing information. Processor 1512 includes a microprocessor, but is not limited to a microprocessor, such as, for example, Pentium™, PowerPC™, Alpha™, etc.

System 1500 further comprises a random access memory (RAM), or other dynamic storage device 1504 (referred to as main memory) coupled to bus 1511 for storing information and instructions to be executed by processor 1512. Main memory 1504 also may be used for storing temporary variables or other intermediate information during execution of instructions by processor 1512.

Computer system 1500 also comprises a read only memory (ROM) and/or other static storage device 1506 coupled to bus 1511 for storing static information and instructions for processor 1512, and a data storage device 1507, such as a magnetic disk or optical disk and its corresponding disk drive. Data storage device 1507 is coupled to bus 1511 for storing information and instructions.

Computer system 1500 may further be coupled to a display device 1521, such as a cathode ray tube (CRT) or liquid crystal display (LCD), coupled to bus 1511 for displaying information to a computer user. An alphanumeric input device 1522, including alphanumeric and other keys, may also be coupled to bus 1511 for communicating information and command selections to processor 1512. An additional user input device is cursor control 1523, such as a mouse, trackball, trackpad, stylus, or cursor direction keys, coupled to bus 1511 for communicating direction information and command selections to processor 1512, and for controlling cursor movement on display 1521.

Another device that may be coupled to bus 1511 is hard copy device 1524, which may be used for marking information on a medium such as paper, film, or similar types of media. Another device that may be coupled to bus 1511 is a wired/wireless communication capability 1525 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    monitoring a user's current interaction with a browser;
    predicting a task a user is likely to take based on a current interaction context associated with the user's current interaction with the browser and one or more rules previously generated based on one or more previously recorded browser interactions, wherein the one or more rules represent a sequence of user interaction states with the browser and events that transition from one interaction state to a successive interaction state; and
    generating, based on the prediction, and displaying a user interface component with the browser, the user interface component selectable by the user and representing a set of one or more interactions associated with one or more rules that the user can select to occur.

2. The method defined in claim 1 further comprising receiving a user selection to initiate the set of one or more interactions and performing the set of one or more interactions in response to receiving the user selection.

3. The method defined in claim 2 wherein receiving a user selection of the user interface component and performing the set of one or more interactions occurs automatically without further user input.

4. The method defined in claim 1 wherein predicting the task the user is likely to take based on the current interaction context comprising matching the current interaction context to a rule; and further comprising mapping interaction events to the user interface component associated with the rule.

5. A method comprising:
monitoring a user's current interaction with a browser;
predicting a task a user is likely to take based on a current interaction context associated with the user's current interaction and one or more rules previously generated based on one or more previously recorded browser interactions, wherein generating at least one of the one or more rules that was previously generated comprises:
identifying, for each trail prefix, one or more matching trails,
selecting, as a candidate for a rule, an identified matching trail based on interaction cost,
optimizing a tail portion of the identified matching trail, and
constructing an interaction rule with the prefix as a head and the optimized tail as a body; and
generating, based on the prediction, and displaying a user interface component with the browser, the user interface component selectable by the user and representing a set of one or more interactions that the user can select to occur.

6. The method defined in claim 5 wherein predicting the task a user is likely to take comprises matching the prefix to the current interactive context.

7. A system comprising:
a display;
one or more memories to store one or more rules and executable instructions, the one or more rules previously generated based on one or more previously recorded browser interactions, wherein the one or more rules represent a sequence of user interaction states with the browser and events that transition from one interaction state to a successive interaction state; and
a processor coupled to the memory and the display to execute the instructions to perform a monitoring component to collect interaction data and provide a current interaction context based on collected interaction data and a rule application component to predict a task a user is likely to take based on the current interaction context and one or more of the rules and to generate, based on the prediction, and display a user interface component on the display, the user interface component selectable by the user and representing a set of one or more interactions associated with one or more rules that the user can select to occur.

8. The system defined in claim 7 further comprising a user input device to receive a user selection to initiate the interaction and perform the set of one or more interactions, in response to receiving the user selection.

9. The system defined in claim 8 wherein the set of one or more interactions occurs automatically without further user input in response to receiving a user selection of the user interface component.

10. The system defined in claim 7 wherein rule application component predicts the task the user is likely to take based on the current interaction context by matching the current interaction context to a rule, and maps interaction events to the user interface component associated with the rule.

11. An article of manufacture having one or more computer readable storage media storing instructions thereon which, when executed by system, cause the system to perform a method comprising:
monitoring a user's current interaction with a browser;
predicting a task a user is likely to take based on a current interaction context associated with the user's current interaction with the browser and one or more rules previously generated based on one or more previously recorded browser interactions wherein the one or more rules represent a sequence of user interaction states with the browser and events that transition from one interaction state to a successive interaction state; and
generating, based on the prediction, and displaying a user interface component with the browser, the user interface component selectable by the user and representing a set of one or more interactions associated with one or more rules that the user can select to occur.

* * * * *